United States Patent Office 3,580,910
Patented May 25, 1971

3,580,910
p-ALKOXY-PIPERIDINE-AMIDES
Max Thiel, Mannheim, Wolfgang Kampe, Heddesheim, Kurt Stach and Wolfgang Schaumann, Mannheim-Waldhof, and Annemarie Ribbentrop, Mannheim, Germany, assignors to Boehringer Mannheim Gesellschaft mit beschrankter Haftung
No Drawing. Filed Jan. 18, 1968, Ser. No. 698,701
Claims priority, application Germany, Jan. 25, 1967, B 90,888
Int. Cl. C07d 29/18
U.S. Cl. 260—240    3 Claims

ABSTRACT OF THE DISCLOSURE

A series of novel p-alkoxy-piperidine-amides having the formula:

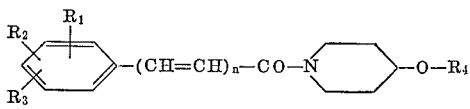

wherein $R_1$, $R_2$ and $R_3$ are each hydrogen, halogen, hydroxyl, alkoxy, alkyl or trifluoromethyl, $R_4$ is lower alkyl, and $n$ is 0 or 1, constituting useful chemotherapeutic agents particularly because of their anticonvulsive, tranquilizing and sedative actions.

This invention relates to certain new p-alkoxy-piperidine-amides and to methods of compounding and using the same. More particularly, this invention relates to a new class of p-alkoxy-piperidine-amides having the formula:

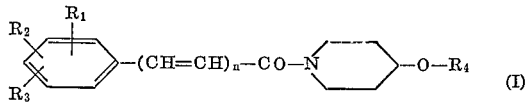    (I)

wherein $R_1$, $R_2$ and $R_3$, which may be the same or different, are each hydrogen, halogen, hydroxyl, alkoxy, alkyl or trifluoromethyl, $R_4$ is lower alkyl, and $n$ is 0 or 1.

A particularly preferred group of compounds, being possessed of outstanding tranquilizing, sedative and anticonvulsive properties, are characterized by the following formula:

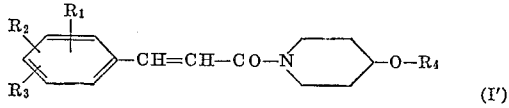    (I')

wherein $R_1$ is methoxy, methyl or chlorine, $R_2$ and $R_3$ are each hydrogen or methoxy and $R_4$ is lower alkyl having 1 to 3 carbon atoms.

The products of this invention are of great therapeutic value, and are characterized by anticonvulsive, tranquilizing and sedative activity.

In accordance with the invention, the new amides of Formula I can be prepared by the conventional methods, as, for example, by the reaction of an acid derivative having the formula:

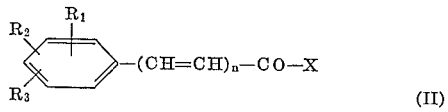    (II)

wherein $R_1$, $R_2$, $R_3$ and $n$ have the same significance as given above and X is a reactive group which can easily be split off, with an alkoxy-piperidine having the formula:

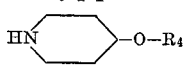    (III)

wherein $R_4$ has the same significance as given above, and when $R_1$, $R_2$ and $R_3$ represent hydroxyl groups, they can, if desired, be converted into alkoxy groups or when they are alkoxy groups, they can, if desired, be converted into hydroxyl groups.

As starting compounds (II), there can be employed the halides, azides, anhydrides and imidazolides. However, it is preferred to use the acid chlorides which are readily available and least expensive.

In order to remove the acid formed during the course of the reaction, there is usually added to the reaction mixture a base, such as triethylamine. However, it is also possible to use an excess of the alkoxy-piperidine (III).

When the substituents $R_1$, $R_2$ and $R_3$ are hydroxyl groups, these can, if desired, be converted into alkoxy radicals by a subsequent reaction with an O-alkylation agent, such as a diazo-alkane or a dialkyl sulfate. On the other hand, particularly activated alkoxy derivatives, such as the 3,4,5-trimethoxy derivatives, can be partially dealkylated by carefully reacting such derivative with, for example, concentrated sulfuric acid.

The following examples are given for the purpose of illustrating the invention and are in no wise to be construed as a limitation thereof.

EXAMPLE 1

1-(3,4,5-trimethoxy-benzoyl)-4-methoxy-piperidine 11.3 g. 3,4,5-trimethoxy-benzoyl chloride in 70 ml. benzene were added dropwise to a mixture of 11.5 g. 4-methoxy-piperidine in 50 ml. benzene. The resulting reaction mixture was boiled under reflux for half an hour, cooled, the benzene solution washed with water, dried with anhydrous potassium carbonate and this benzene phase evaporated. The evaporation residue was recrystallized from benzene. There were thusly obtained 11.7 g. (75% of theory) 1-(3,4,5-trimethoxy-benzoyl)-4-methoxy-piperidine, having a melting point of 75–76° C.

EXAMPLE 2

1-(3,4,5-trimethoxy-cinnamoyl)-4-methoxy-piperidine 14.2 g. 3,4,5-trimethoxy-cinnamoyl chloride in 180 ml. benzene were added to a mixture of 13.9 g. 4-methoxy-piperidine in 65 ml. benzene. The reaction mixture thereby formed was boiled under reflux for half an hour, cooled and extracted with water. The resulting benzene solution was dried and evaporated. The evaporation residue was then recrystallized from isopropanol. There were thusly obtained 12 g. (64.5% of theory) 1-(3,4,5-trimethoxy-cinnamoyl)-4-methoxy-piperidine, having a melting point of 130–131° C.

EXAMPLE 3

1-(p-chlorocinnamoyl)-4-isopropoxy-piperidine 10.05 g. (50 mmol) p-chlorocinnamoyl chloride were dissolved in 50 ml. anhydrous tetrahydrofuran. A solution of 7.16 g. (50 mmol) 4-isopropoxy-piperidine and 5.05 g. (50 mmol) triethylamine in 50 ml. anhydrous tetrahydrofuran was slowly added thereto dropwise, while stirring and at ambient temperature. After this dropwise addition had been completed, the reaction mixture was further stirred for 2 hours, the precipitated material which formed was filtered off with suction and the filtrate evaporated in a vacuum. The resulting residue was taken up in 100 ml. ether, the ethereal solution was successively washed with a saturated solution of sodium carbonate, dilute hydrochloric acid and water, then dried and evaporated. The residue was thereafter recrystallized from cyclohexane. There were obtained 8.7 g. (57% of theory) 1-(p-chlorocinnamoyl)-4-isopropoxy-piperidine, having a melting point of 108–110° C.

EXAMPLE 4

1-(p-chlorocinnamoyl)-4-methoxy-piperidine 10.05 g. (50 mmol) p-chlorocinnamoyl chloride, 5.76 g. (50 mmol) 4-methoxy-piperidine and 5.05 g. (50 mmol) triethylamine were reacted and worked up according to the procedure described in Example 3. The crude product which was obtained was recrystallized from ethanol/water. There were recovered 11.1 g. (79% of theory) 1-(p-chlorocinnamoyl)-4-methoxypiperidine, having a melting point of 96–98° C.

EXAMPLE 5

1-(p-methoxy-cinnamoyl)-4-methoxy-piperidine 9.8 g. (50 mmol) p-methoxy-cinnamoyl chloride, 5.76 g. (50 mmol) 4-methoxy-piperidine and 5.05 g. (50 mmol) triethylamine were reacted and worked up by the method described in Example 3. The crude product thereby obtained was first treated with activated charcoal and then recrystallized from benzene/cyclohexane. There were recovered 9.0 g. (66% of theory) 1-(p-methoxy-cinnamoyl)-4-methoxy-piperidine, having a melting point of 101–103° C.

EXAMPLE 6

1-(m-methoxy-cinnamoyl)-4-methoxy-piperidine 9.8 g. m-methoxy-cinnamoyl chloride, 5.76 g. 4-methoxy-piperidine and 5.05 g. triethylamine were reacted and worked up according to the method of Example 3. The crude product thereby obtained was recrystallized from benzene/cyclohexane. There were recovered 8.3 g. (60% of theory) 1-(m-methoxy-cinnamoyl)-4-methoxy-piperidine, having a melting point of 57–58° C.

EXAMPLE 7

1-(3,4-dimethoxy-cinnamoyl)-4-methoxy-piperidine 11.3 g. 3,4-dimethoxy-cinnamoyl chloride, 5.76 g. 4-methoxy-piperidine and 5.05 g. triethylamine were reacted and worked up by a method analogous to that described in Example 3. The crude product which was thereby formed was recrystallized from cyclohexane. There were thereby obtained 9.8 g. (64% of theory) 1-(3,4-dimethoxy-cinnamoyl)-4-methoxy-piperidine, having a melting point of 98–101° C.

EXAMPLE 8

1-(p-methyl-cinnamoyl)-4-methoxy-piperidine 9.0 g. p-methyl-cinnamoyl chloride. 5.76 g. 4-methoxy-piperidine and 5.05 g. triethylamine were reacted and worked up using a method analogous to that described in Example 3. The crude product thus obtained was recrystallized from benzene/cyclohexane. There were recovered 8.1 g. (62% of theory) 1-(p-methyl-cinnamoyl)-4-methoxy-piperidine, having a melting point of 89–91° C.

EXAMPLE 9

1-(3,4,5-trimethoxy-benzoyl)-4-isopropoxy-piperidine 3.9 g. 3,4,5-trimethoxy-benzoyl-chloride in 30 ml. benzene were added to a solution of 4.8 g. 4-isopropoxy-piperidine in 50 ml. benzene. The resulting reaction mixture was boiled under reflux for 2 hours, cooled and shaken with water. The benzene phase was dried and then evaporated. The resulting residue was triturated with ether-ligroin and then filtered off with suction. There were thusly obtained 2.9 g. (53% of theory) 1-(3,4,5-trimethoxy-benzoyl)-4-isopropoxy - piperidine, having a melting point of 65–66° C.

EXAMPLE 10

1-(3,5-dimethoxy-cinnamoyl)-4-methoxy-piperidine

A mixture of 4.2 g. 3,5-dimethoxy-cinnamic acid, 8.0 g. oxalyl chloride and 150 ml. anhydrous benzene was boiled under reflux for 2 hours. The reaction mixture was then evaporated in a vacuum, the residue taken up in benzene and evaporated and this process again repeated. Finally, the residue was again taken up in 200 ml. anhydrous benzene. Thereafter a mixture of 2.3 g. 4-methoxy-piperidine, 2.02 g. triethylamine and 25 ml. anhydrous benzene was slowly added thereto in dropwise fashion at ambient temperature, while stirring. The resulting reaction mixture was left to stand overnight and then washed, first with a solution of sodium bicarbonate, then with 0.5 N hydrochloric acid and finally with water. Thereafter it was dried with anhydrous sodium sulfate. The benzene was then distilled off and the residue which was obtained recrystallized from isopropanol. There were thusly obtained 4.9 g. (81% of theory) 1-(3,5-dimethoxy-cinnamoyl)-4-methoxy-piperidine, which had a melting point of 115–118° C.

EXAMPLE 11

1-(3,5-dimethoxy-cinnamoyl)-4-isopropoxy-piperidine

Using a method analogous to that described in Example 10, 3,5-dimethoxy-cinnamoyl chloride was first prepared from 4.2 g. 3,5-dimethoxy-cinnamic acid and 8 g. oxalyl chloride. A mixture of 2.9 g. 4-isopropoxy-piperidine, 2.02 g. triethylamine and 25 ml. benzene was then added thereto and the resulting reaction mixture allowed to stand overnight. The mixture was thereafter further worked up in a manner analogous to that described in Example 10. Following the recrystallizing thereof twice from cyclohexane, there were obtained 2.8 g. (42% of theory) 1-(3,5-dimethoxy-cinnamoyl) - 4 - isopropoxy-piperidine, having a melting point of 69–71° C.

The various compounds of the invention constitute excellent tranquilizing, sedative and anti-convulsant agents.

The efficacy of the novel p-alkoxy-piperidine-amides was established by the following experimental procedures:

(I) Muscle relaxing effect ($LD_{50}/ED_{50}$ inclined plane).—The toxicity was determined as $LD_{50}$ (mg./kg. intraperitoneal) 24 hours following injection of the test compound. Thirty minutes following injection of test compound, the injected animals were placed on an inclined plane having an angle of inclination of 80°, the plane being equipped with thin metal wires. Those animals who slide off within one minute are considered positive. The $ED_{50}$ is determined according to Litchfield & Wilcoxon. The quotient for the $LD_{50}/ED_{50}$ is then calculated. The larger the quotient, the better is the specific muscle-relaxing effect.

(II) Sedative effect (urethane-sleep potentiation).—The potentiation of the narcotic effect of urethane is an accepted measure of the sedative effectiveness of a test compound. In this procedure, the test compound is subcutaneously injected in varying dosages into mice. 15 minutes following this injection, 1 g./kg. urethane is administered intraperitoneally. This amount represents a subnarcotic dosage under the effects of which otherwise untreated animals assume a side reclining position. The dosages of test compounds were determined which after an additional 15 minutes cause 50% of the thusly treated animals to assume a back reclining position. ($ED_{50}$)

(III) Anti-convulsive effect (inhibition of the Cardiazol extension spasm).—10 mice/dose were administered the test compound i.p. and 30 minutes later the same animals were given 150 mg./kg. Cardiazol (pentamethylene-tetrazol) s.c. In addition to inducing tonic-clonic contractions, Cardiazol alone produces an extension spasm of the hind legs which very easily is observed. The inhibition of this extension spasm is evaluated as $ED_{50}$ according to the procedure described by Litchfield & Wilcoxon.

The following compounds were employed in the tests:

(A) 1-(3,4,5-trimethoxy-cinnamoyl)-4-methoxy-piperidine
(B) 1-(p-methyl-cinnamoyl)-4-methoxy-piperidine
(C) 1-(p-chloro-cinnamoyl)-4-methoxy-piperidine (D) 1-(p-methoxy-cinnamoyl)-4-methoxy-piperidine
(E) 1-(3,4-dimethoxy-cinnamoyl)-4-methoxy-piperidine
(F) 1-(p-chloro-cinnamoyl)-4-isopropoxy-piperidine
(G) 1-(m-methoxy-cinnamoyl)-4-methoxy-piperidine
(H) Trioxazin-Trimetozinium-4-(3,4,5-trimethoxy-benzoyl)-morpholine The results of the investigation are set out in the following table:

TABLE

Active doses in the mouse—$LD_{50}/ED_{50}$, in mg./kg. i.p.

|   | $LD_{50}$ (24 hr.) | Inclined plane $ED_{50}$ (30 min.) | $LD_{50}/ED_{50}$ inclined plane | Urethane sleep potentiation $ED_{50}$ (30 min.) | Inhibition cardiazol-extension spasm $ED_{50}$ (30 min.) |
|---|---|---|---|---|---|
| H | 1,000 | 600 | 1.7 | 69 | >200 |
| A | 645 | 265 | 2.4 | 5.4 | 30 |
| B | 1,000 | 500 | 2.0 | 36 | 200 |
| C | 100 | 100 | 1.0 | 9.0 | 40 |
| D | 150 | 150 | 1.0 | 28 | 50 |
| E | 150 | 150 | 1.0 | 33 | 50 |
| F | 350 | 100 | 3.5 | 10 | 46 |
| G | 350 | 200 | 1.8 | 50 | 50 |

As can be seen from the table, the compounds in accordance with the invention are possessed of an increased sedative effect as compared to the known sedative agent Trioxazin. The effect is increased by at least one-tenth power. The same is true also with respect to the anticonvulsive activity, while the muscle relaxing effect is approximately of the same order of magnitude. The compound 1 - (3,4,5-trimethoxy-cinnamoyl) - 4 - methoxy-piperidine was shown to have particularly desirable properties and furthermore to be characterized by a greater therapeutic range than the comparison compound Trioxazin.

One of the aspects of the invention is to provide compositions containing p-alkoxy-piperidine-amides in accordance with the invention for use as tranquilizing, anticonvulsive and sedative agents. According to the invention, the novel p-alkoxy-piperidine-amides may be associated with a carrier which may be either a solid material or a sterile parenteral liquid. The compositions may take the form of tablets, powders, capsules or other dosage forms, which are particularly useful for oral ingestion. Liquid diluents are employed in sterile condition for parenteral use, that is, by injection. Such a medium may be a sterile solvent, such as water; the compositions may take the form of the active material, namely, the p-alkoxy-piperidine-amides, admixed with solid diluents and/or tableting adjuvants, such as corn starch, lactose, talc, stearate talc, magnesium stearate, gums, or the like. Any of the tableting materials used in pharmaceutical practice may be employed where there is no incompatability with the p-alkoxy-piperidine-amides constituting the active agent. The material may be tableted with or without adjuvants. Alternatively, the p-alkoxy-piperidine-amide of the invention, with its adjuvant material may be placed in the usual capsule or resorbable material, such as the usual gelatin capsule and administered in that form. In yet another embodiment, the novel p-alkoxy-piperidine-amide composition may be put up into powder packets and employed in that fashion. Or the p-alkoxy-piperidine-amides may be prepared in the form of a suspension material in which the p-alkoxy-piperidine-amide is not soluble.

The precentage of active ingredients in the compositions may be varied. It is necessary that the active ingredient constitute a portion such that a suitable dosage will be obtained. Obviously, several unit dosage forms may be administered at about the same time.

What is claimed is:

1. A p-alkoxy-piperidine-amide having the formula

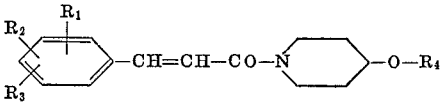

wherein $R_1$, $R_2$ and $R_3$ are each a member selected from the group consisting of hydrogen, halogen, hydroxyl, alkoxy, alkyl and trifluoromethyl, and $R_4$ is lower alkyl.

2. A p-alkoxy-piperidine-amide according to claim 1 having the formula

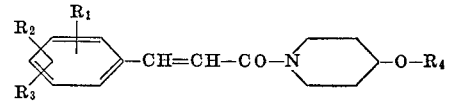

wherein $R_1$ is a member selected from the group consisting of methoxy, methyl and chlorine, $R_2$ and $R_3$ are each a member selected from the group consisting of hydrogen and methoxy and $R_4$ is lower alkyl having 1 to 3 carbon atoms.

3. A p-alkoxy-piperidine-amide according to claim 1 designated 1 - (3,4,5 - trimethoxy-cinnamoyl)-4-methoxy-piperidine.

References Cited

UNITED STATES PATENTS 3,268,407   8/1966   Hofmann _____ 260—240X

FOREIGN PATENTS 245,904   7/1963   Australia _____ 260—240X
872,350   7/1961   Great Britain _____ 260—294.7

OTHER REFERENCES

McElvain et al.: J. Am. Chem. Soc., vol. 71, p. 901 (1949).

Casy: Experientia, vol. 20, p. 437 (1964).

JOHN D. RANDOLPH, Primary Examiner

U.S. Cl. X.R.

260—294.7, 544; 424—267